United States Patent [19]

Whitfield et al.

[11] Patent Number: 4,473,113

[45] Date of Patent: Sep. 25, 1984

[54] METHODS AND MATERIALS FOR CONDUCTING HEAT FROM ELECTRONIC COMPONENTS AND THE LIKE

[76] Inventors: Fred J. Whitfield, 1405 S. Village Way, Santa Ana, Calif. 92705; Arthur T. Doyel, 4402 Casa Oro, Yorba Linda, Calif. 92686

[21] Appl. No.: 371,731

[22] Filed: Apr. 26, 1982

Related U.S. Application Data

[63] Continuation-in-part of Ser. No. 168,551, Jul. 14, 1980, which is a continuation-in-part of Ser. No. 896,177, Apr. 14, 1978, Pat. No. 4,299,715.

[51] Int. Cl.³ .............................................. F28F 7/00
[52] U.S. Cl. ......................... 165/185; 165/80 B; 174/16 HS; 252/71; 428/484
[58] Field of Search ............... 165/80 B, 185, DIG. 7; 174/16 HS, 35 GC; 428/486, 484; 252/70, 74, 71; 126/400

[56] References Cited

U.S. PATENT DOCUMENTS

| | | | |
|---|---|---|---|
| 3,467,547 | 9/1969 | Harvey | 428/486 |
| 3,972,821 | 8/1976 | Weidenbenner et al. | 165/185 |
| 4,065,908 | 1/1978 | Mueller | 53/15 |
| 4,139,051 | 2/1979 | Jones et al. | 165/185 |
| 4,237,086 | 12/1980 | Gehle | 174/16 HS |

FOREIGN PATENT DOCUMENTS

| | | | |
|---|---|---|---|
| 600823 | 6/1960 | Canada | 165/80 B |
| 1086003 | 10/1967 | United Kingdom | 165/80 B |

*Primary Examiner*—Samuel Scott
*Assistant Examiner*—Margaret A. Focarino
*Attorney, Agent, or Firm*—Grover A. Frater

[57] ABSTRACT

A heat conductive material in solid form which is readily excoriated whereby it can be applied by rubbing on the surface to which it is to be applied is formed, in the preferred form, by mixing finely divided heat conducting solids in a waxy material. That material is formed of waxes, or certain fats, and is solid in the range of normal room temperatures. In preferred form, it becomes molten at temperatures in that range just above normal room temperature at which heat generating electronic semi-conductor devices often operate.

The mixture is applied at normal room temperature in sheet insulator form by rubbing, or at elevated temperature by painting. It is applied to the surfaces to be mated and across which heat is to be conducted whereupon the surfaces are mated with the coating between them.

1 Claim, 15 Drawing Figures

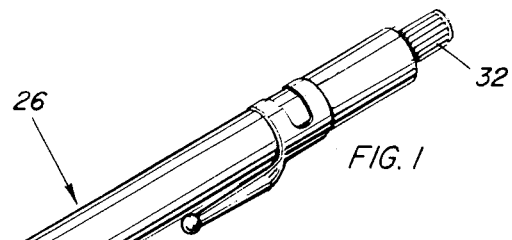
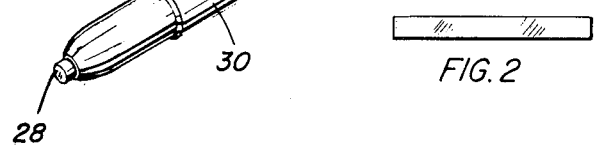
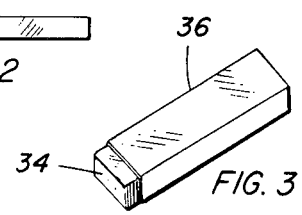
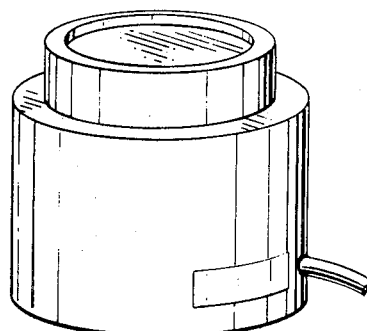
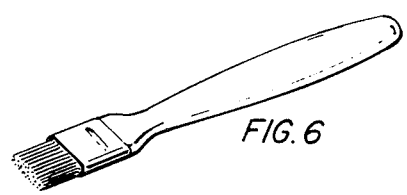
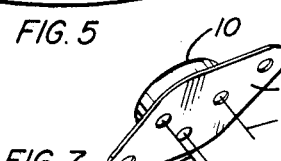
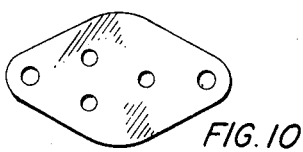
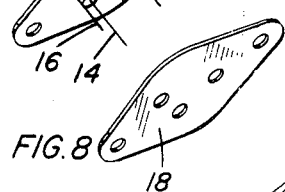
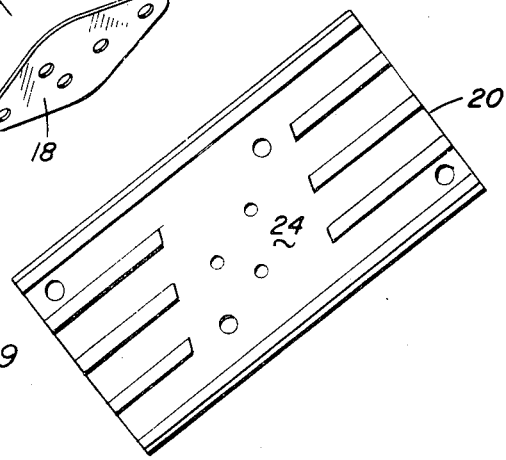

METHODS AND MATERIALS FOR CONDUCTING HEAT FROM ELECTRONIC COMPONENTS AND THE LIKE

CROSS-REFERENCE TO RELATED APPLICATIONS

This application is a continuation-in-part application of application Ser. No. 168,551, filed July 14, 1980, which was a continuation-in-part of application Ser. No. 896,177, filed Apr. 14, 1978 and is now U.S. Pat. No. 4,299,715.

TECHNICAL FIELD

This invention relates to improved methods and materials for removing heat by conduction, particularly from solid state and other electronic devices.

BACKGROUND ART

Some electronic components, particularly solid state active devices such as diodes, transistors, and integrated circuitry, are adversely affected by heat. Their electrical characteristics undergo large relative changes at temperatures in the range just above room temperatures. As a consequence, it is common in the design of electronic apparatus to attempt to keep the temperature of such devices as cool as possible. They often generate heat at a rate that requires conduction cooling rather than mere convection cooling. Heat is conducted from the device to a heat sink which is cooled by convection and radiation. The effectiveness of the attempt to move heat from the device to the heat sink depends in part upon the cross-sectional area of the conductive path, and that depends, in part, upon the degree of smoothness of the surfaces at the interface between the device and its sink. Heat sinks are usually made of metal. When the device must be insulated electrically from the sink, a layer of mica or other insulating material is interposed between them. In that case, the effective area of the heat conducting path depends upon the degree of smoothness of four surfaces rather than two. Any surface irregularities result in voids at the interface across which little heat is conducted.

To provide a high degree of smoothness at the interface is costly and may be impractical. The practical alternative has been to make a paste of a semi-liquid carrier and powders of heat conducting material. That paste is applied on one or more of the mating surfaces between the device and its heat sink and insulator.

The common vehicle is silicone grease. This works well, but it is messy and it contaminates equipment, work stations and clothing, and cannot be completely removed as it is not soluable. It is so messy that getting production workers to use it is an industry-wide problem. One alternative is to use a gasket of polymeric material, often silicone rubber, in which a heat conductive material has been suspended. That alternative works in some cases, but it requires the use of heavy fastening elements and heavy torquing which, in some cases, does not fill the resulting voids. This invention provides a better solution, a solution that costs less, works just as well, and that does not have the disadvantages of past materials and processes.

DISCLOSURE OF THE INVENTION

An object of the invention is to provide improved methods and materials for conducting heat from a heat generator, such as an electronic element, to a heat sink.

It is an object to provide an improved thermally conductive material that is easier to use and cleaner to use than prior materials. It is a related object to provide a material which may be used in solid form, or which is in solid form when used, but which will become fluid when performing its function.

Another obejct is to provide a thermally conductive material that is readily excoriated at normal room temperatures by rubbing, and which will adhere to the surface on which it was rubbed.

It is another object to provide a novel method of protecting electronic devices by facilitating the transfer of heat from the device to a body which it engages in which method a body of a heat conductive material that is solid at room temperature, and thereafter applying a layer of that material to at least one of the surfaces that will be engaged when the device and the body are connected. Thereafter, the device and the body are brought into engagement.

It is another object to provide a novel method of protecting electronic devices by facilitating the transfer of heat from the device to a body which it engages in which method a mixture is made of a heat conductive material in solid form with a waxy material that is solid at room temperature, and thereafter applying a layer of that material to at least one of the surfaces that will be engaged when the device and the body are connected. Thereafter, the device and the body are brought into engagement.

A further object is to provide, for application to the surfaces of components of electronic apparatus, a heat conducting material including a substantially uniform mixture, in solid form, of finely divided solid heat conducting material and a waxy substance which is solid at room temperature. Still another object is to provide a gasket which has been impregnated with such a material.

The fact that heat conductive material becomes fluid or plastic enough to flow when heated causes that material to conform to the shape of the surfaces from which heat is to be removed and to which the heat is transferred. That maximizes contact area and accounts for efficiency of heat transfer. However, continued efficiency with use requires that the heat conductive material be structured or retained or contained such that it will remain in place between the heat source element and the sink. In most applications, a fastening element is employed to interconnect the source element and the heat sink. Such an element can and does operate to compress the heat conductive material between the source element and sink at the time of assembly. It is required to ensure that the compressive effect is experienced or the structural integrity of the heat transfer path is maintained at each heating or reheating of the heat conductive material to plastic form. The preferred form of the invention has the heat conductive material contained in a structure which will exhibit some resilience or which is wetted by the heat conductive material such that surface tension is utilized to help maintain structural integrity.

A sheet material formed of mono-filament fibers is preferred. Preferred forms employ polymeric or glass filaments. Glass is best. Celulose fibers are satisfactory if treated so that they are equivalent to mono-filaments and cannot absorb moisture. Treated paper of the kind employed in making electrolytic capacitors is an example.

While the heat conductive material may comprise other substances, waxes and fats are best. They wet glass and plastic fibers, and treated paper fibers, when molten.

The mono-filament fibrous sheet materials have another advantage. The fibers are arranged so that the sheets exhibit some resilience in the direction of their thickness. Their fibers are smooth enough to permit impregnation of the sheet by waxes and fats when those materials contain powdered oxides and other heat conducting fillers without filtering out those fillers.

BRIEF DESCRIPTION OF THE DRAWINGS

In the drawings:

FIG. 1 is an isometric view of an automatic pencil type dispenser in which the material to be dispensed embodies a composition made according to the invention;

FIG. 2 is a view in side elevation of a rod of replacement heat conducting compound for use in the dispenser of FIG. 1;

FIG. 3 is an isometric view of a bar of material made according to the invention housed in a rectangular dispensing tube;

FIG. 4 is a view in side elevation of a rod of material made according to the invention packaged in a paper wrapper in marker pencil form;

FIG. 5 is an isometric drawing of a heated pot containing a quantity of molten material made according to the invention;

FIG. 6 is an isometric view of a brush suitable for use in applying the material that is heated in the heater pot of FIG. 5;

FIGS. 7 and 8 are isometric views of a semi-conductor device and an insulating washer, respectively;

FIG. 9 is a top plan view of a metal heat sink of the kind that is suitable for mounting the semi-conductor device and insulator of FIGS. 7 and 8;

FIG. 10 is a top plan view of a gasket impregnated with a heat conducting material according to the invention;

FIG. 11 is an isometric view of a marking device of another form and made according to the invention;

DESCRIPTION OF THE PREFERRED EMBODIMENT

Figure 12:
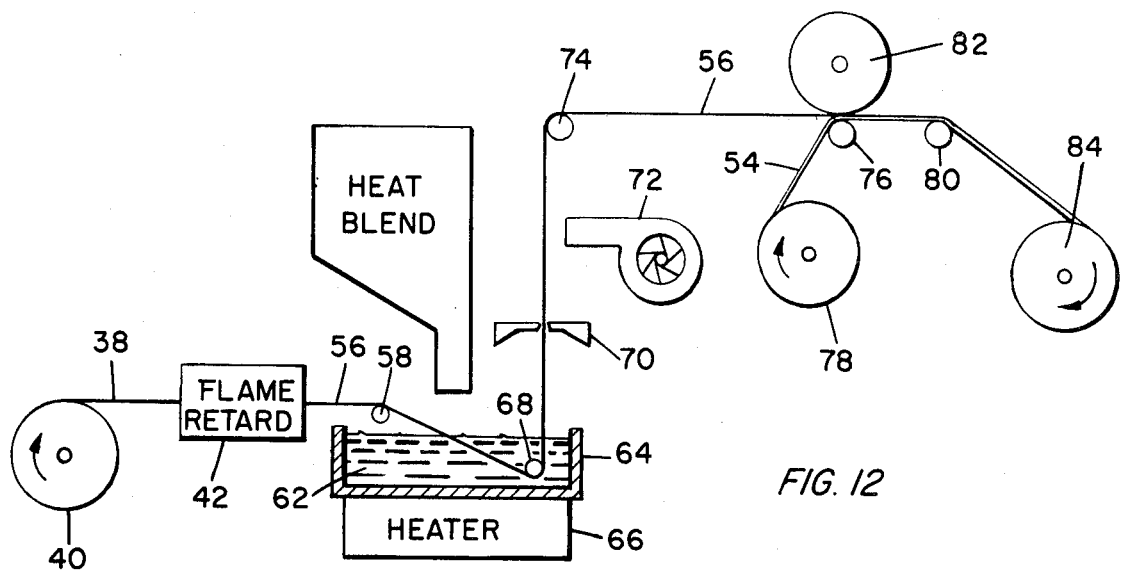
FIG. 12 is a diagram of processing apparatus suitable for use in producing gaskets that are similar in application to the gasket of FIG. 10.

In the invention a wax-like heat conducting material is combined in one form with a heat conducting material to form a mixture whose purpose is to complete a thermal, conductive path from a heated element to a heat sink. The heated element may be a semi-conductor diode or transistor of integrated circuit device, or the like, which generates sufficient heat during its operation so that some means must be provided for conducting that heat away. A representative device of that kind is shown in FIG. 7 of the drawing where it is designated generally by the reference numeral 10. It is fitted with three conductor leads identified by the reference numerals 12, 14 and 16. The device shown is a voltage regulator which becomes so hot in normal operation as to destroy itself unless some of the heat generated is conducted away. It is mounted in a metal case, and the conductor lead 12 is connected electrically to the case. The other two leads, 14 and 16, are insulated from it. It is often required that the metallic case of the device be insulated from chassis ground potential, and it is often impractical to provide a heat sink mounting structure for the device 10 which is insulated from chassis ground potential. The problem that this creates is solved by interposing an insulator, such as the insulator 18 of FIG. 8, between the device 10 and the heat sink 20 of FIG. 9. The lead wires of the device extend through appropriately placed openings in the insulator 18, and they extend through corresponding larger openings in the heat sink 20. All three items are provided with openings to accommodate fastening members which interconnect the three parts. The fastening elements, usually machine screws and nuts, are ordinarily made of conductive material. Some means, not shown here, are commonly provided so that the fastening elements will be insulated from one or the other of the electronic device or the heat sink.

The conductive path for heat extends from the lower face 22 of the semi-conductor device through the thickness of the insulating washer 18 of the surface 24 of the aluminum heat sink 20. While the surface of all of these elements is relatively smooth, on a microscopic scale they are not smooth, and when placed together a substantial number of microscopic voids can be expected to exist. Such voids will exist at the juncture of the surface 22 with one side of the insulator and at the juncture of the other side of the insulator with the surface 24 of the heat sink.

Since almost any material is a better conductor of heat than air, the addition of any material that will fill those voids, and which does not itself present a long heat path, will contribute to increased conduction of heat from the electronic device. However, a number of materials are available which are good conductors of heat and which can be applied to these several surfaces in a form that will serve to fill the voids with heat conducting material. The invention can use almost any of those known heat conductive materials when they have solid form. Thus, powders of berrilium oxide, zinc oxide, aluminum oxide, and the like, are well known and often used materials and are excellent for use in the invention. They are relatively low cost and effective. They are heat conductors, but they also are electrical insulators. To have a heat conductor which is an electrical insulator is an advantage, notwithstanding that an insulator such as insulator 18 is used because such a heat conductor will not create short circuiting as a consequence of excess material remaining at the margins of the insulator.

In some circumstances, it is not necessary to provide electrical insulation. In those cases, it is preferred to use high thermal conductive metallic powders due to their higher heat conductivity.

The heat conducting material having been selected, it remains to determine how to apply the heat conductive material and have it remain in place. The conventional way to do that has been to mix one of the heat conductive materials into a grease, usually silicone grease, and then to apply the mixture to leave in the mating surfaces when the parts are brought into engagement. The grease is easy to apply, but it is messy, both in the original installation and in the event that servicing and replacement of the parts is required. In the invention, the problem is solved by providing the heat conducting material in a vehicle that is solid at room temperatures, but does not perform an adhering function. The materials of the invention are such, in the preferred form, that they melt at temperatures just above the range of normal room temperatures. Thus, they melt above normal room temperature but below the desired operating temperature of the device. Because of that, it is easy to melt the material in a heater pot similar to a glue pot or solder pot, except that the temperature may be lower. The molten material may be painted on the surfaces to be mated. That mode of operation is possible, and in some instances may be desirable. However, in the preferred mode of practicing the invention, the heat conductive material forms part of a mixture which is easily excoriated. The material oblates when it is rubbed over the surfaces to be mated so that a layer of that material in solid form remains on the surface that has been rubbed with it.

Since the material is solid, it can be formed in any shape that makes application by rubbing convenient. In the preferred form, it is shaped as a rod or a bar, and it is covered with something that makes it clean and easy to handle. In FIG. 1, a short length of material in rod form is housed in a plastic marker pencil housing of the kind that is often called an automatic pencil. In FIG. 1, the entire structure is identified by the reference numeral 26. The "lead" 28 is a short rod of heat conducting material according to the invention. It extends from the pencil holder 30 in a degree determined by the degree of manipulation of the operator 32, and the end of the rod is rubbed over the surfaces that are to be coated. An example of a refill rod for the holder of FIG. 1 is shown in FIG. 2.

An alternative arrangement is shown in FIG. 3. Here, a geometrically-shaped bar 34 of heat conducting material according to the invention is housed in a corresponding geometrically-shaped plastic tube 36. The bar 34 is pushed through the tube with ease so that an appropriate portion of it will extend from the tube. The material of the enclosing tube 36 is sufficiently flexible so that, when held between an operator's fingers, the sides of the tube will yield and be compressed against bar 34. The exposed end will remain exposed as it is rubbed against the surfaces to which the heat conducting material is to be applied.

FIG. 4 shows still another form in which rods of the heat conducting mixture may be packaged. In this case, a rod of the material is wrapped in a paper wrapper arranged so that it can be torn in spiral fashion at one end to expose a short length of the heat conducting mixture.

FIG. 11 shows still another form in which the heat conductive material is formed in the shape of a crayon.

The utility of the invention, to the extent that the mixture is to be applied by rubbing action, depends upon the material being excoriated from the application material and upon a quantity of it adhering in a thin layer to the heat transfer surface. That quality is incorporated in the material of the invention by mixing the heat conductive material with a waxy substance. Waxy substance is defined to include those materials which, like waxes, will ablate when rubbed. They can be excoriated by marking or rubbing, and they melt or become plastic in a temperature range above the range of normal room temperatures. That latter feature is not essential to successful practice of the invention, but it is very advantageous, and it is an important feature of the invention. While the mixture must have solid form in the range of normal room temperatures, it is preferrable that it become plastic or molten at the higher temperatures by the device being protected whereby to ensure that there will be a sufficient filling of all of the voids between the surfaces in the heat conduction path.

The majority of waxes and fats, natural or synthetic, are suitable materials. Beeswax, palm wax, and the mineral waxes, are representative examples. Certain fats exhibit the required characteristics, notwithstanding that they include glycerin. In practice, it is sometimes desirable to include several waxes and fats in combination to avoid any tendency to crumble at the lower room temperatures or to become too plastic at higher room temperatures. Preferred material for inclusion with true waxes are vegetable oils of the kind that are used for cooking and ordinary petroleum jelly. A number of examples of suitable mixtures are set out below. In each case, the term "parts" means parts by weight.

In one example, material according to the invention has the following composition:

| Material | Parts |
|---|---|
| Beeswax | 50 |
| BeO Powder | 30 |
| Petroleum Jelly | 12 |

The berillium oxide and petroleum jelly are mixed into the beeswax while the latter is maintained in a molten state.

In another example:

| Material | Parts |
|---|---|
| Paraffin | 3 |
| Zinc Oxide Powder | 4 |
| Petroleum Jelly | 1 |

These materials may be heated to a molten state at 50° C. to 60° C. and applied with a brush to the heat sink surface to which a power transistor is to be mounted. A quantity of the same material is painted on the mounting surface of the transistor. After the material has cooled to solid form, the transistor is mounted on the heat sink with an insulating washer between them. In another example:

| Material | Parts |
|---|---|
| ZnO, Al$_2$O$_3$ or BeO | 35–65 |
| Paraffin | 30–65 |
| Petroleum Jelly | 5–20 |

These materials are heated above the melting point of the wax and are combined and thoroughly mixed. Mixing is continued as the mixture is cooled until it approaches solid state. It is compressed while plastic at a temperature a few degrees below melting into a solid mass. The mass is extruded at a lower temperature, but above room temperature, into rod or spaghetti form 0.3 to 0.6 centimeters in diameter. The larger rods are wrapped in paper to pencil shape. The smaller rods are cut to a length of two to four centimeters and packaged for insertion in "automatic" pencil or marker dispensers.

In both the pencil and automatic dispenser form the material is used by rubbing an end of the rod over one of the surfaces to be engaged when an electronic device is mounted on a heat sink. Rubbing continues until the surface is covered by a thin layer of material excoriated from the rod. Thereafter, the electronic device and heat sink are connected. During operation of the apparatus, the mixture may become molten. During servicing of the apparatus, when it is cooled and at normal room temperature, the mixture will again become a solid.

In another example, fifty parts by weight of candle wax and fifty parts by weight of aluminum powder are mixed with ten parts by weight of vegetable oil at elevated temperature to produce a uniform mixture. The mixture is then cooled and extruded into bar form. It is covered with a protective covering of removable material. This material is used in the same manner as the material of the preceding example.

Wax is a particularly useful material for use in the invention because it expands when heated and increases the contact pressure when heat transfer needs to be most effective. Also, it wets the surface of the semi-conductor and the heat sink to the end that any air that is trapped in the space under the electronic component becomes entrained in the wax. After the initial melting of the wax, any air is displaced away from the surface of the electronic component and sink. Thereafter, heat flows around that entrained air rather than through it.

An apparatus for producing thermally conductive, electrically insulating gaskets is shown schematically in FIG. 12. A web or tape 38, formed of a material which can be impregnated or loaded with an electrically insulating heat conducting material of the kind herein described, is stored upon a reel 40. During the production of heat transfer gaskets, the tape 38 is transported through a machine 42 of conventional kind in which the tape is rendered flame resistant and flame retardant. The tape 38 is threaded over a guide roller 58 and then extends down into a body 62 of heat conductive insulating material contained in a container 64 and heated by a heater 66. The tape 56 extends around a guide roller 68 which ensures that the tape 56 is immersed in the heated body of heat conductive material 62 such that the tape becomes thoroughly loaded with that heat conductive material.

After passing under guide roller 68, the now saturated or loaded tape passes between the elements of a stripper 70 which is sometimes called a "squeegee" the function of which is to remove excess quantities of heat conductive material that may cling to the tape. That excess flows down the upwardly preceding tape back into the container 64. After passing through the stripper 70, the tape passes through a cooling apparatus, here represented by the blower 72. After passing beyond the cooling means, the tape and the heat conductive substance have been cooled sufficiently so that the latter is in somewhat semi-solid state. Thereafter, the tape passes over guide roller 74 and then between a disc cutting roller 82 and a back-up roller 76.

At those two rollers, the tape 38 is joined with the slip tape 54. The slip tape is stored on a reel 78 and extends from that reel over the back-up roller 76 such that it underlies the tape 38.

Figure 13:
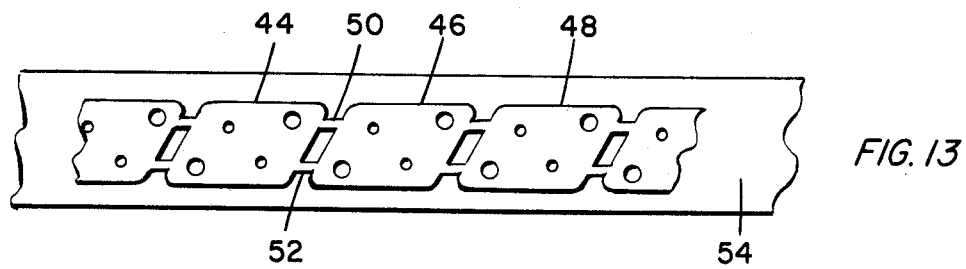
FIG. 13 is a top view of a fragment of the gasket-roll product that is produced by the apparatus of FIG. 12.

Portions of the web or tape are stamped away so that what remains is an interconnected series of individual gaskets. In the case illustrated, the gaskets have the shape and are interconnected one with the other as illustrated in FIG. 13. Here, individual gaskets 44, 46 and 48 are part of the series of gaskets each of which is interconnected with the preceding and succeeding gasket by the small interconnecting portion of the web or tape which may be easily torn or severed. For identification, the two interconnecting elements that interconnect the gasket elements 44 and 46 are numbered 50 and 52 in FIG. 13.

In FIG. 13, the series of gaskets is shown to overlie the supporting tape 54 which is usually referred to as a slip tape or slip sheet. The series of gaskets is joined to the slip tape 54 at a later point in the manufacturing process. What emerges from the stamping or die cutting roller 82 is a tape 56 which is essentially the tape 38 modified to form a series of interconnected gaskets as shown in FIG. 13.

Thereafter, the two tapes, now preceding at equal speed so that there is no relative motion between them, pass over the guide roller 80. The series of gaskets that form tape 56 is pulled firmly against the slip tape 54. The two tapes or webs are urged together to the end that the gaskets tend to adhere to the surface of the slip tape so that the two tapes remain together during ordinary handling, but so that the gaskets may be readily peeled, one at a time, from the slip tape. Finally, the finished product is wound upon the reel 84.

It is preferred that the web 38, from which the insulating gaskets are fashioned, be made of a fire resistant, loosely woven fibrous material or of a porous fiber or synthetic sheet material. A primary function of the tape or web 38 is to take up and hold the wax or fatty materials that will melt at elevated temperatures to fill the voids between the electronic device to be protected against excessive temperatures and the heat sink into which heat from the electronic device is to be transported. The most important part of that function is simply to fill voids and to replace air so that the heat flow path can proceed through a solid or liquid material. The addition of good heat conductors to the constituent that melts improves the efficiency of heat transfer. The material of the web 38 participates in the heat transfer process. It is electrically nonconductive and it, too, helps to fill the voids between the heat sink and the electronic device to be protected. Thus, the material of the web is one of the constituents of the electrically insulating and thermally conductive substance provided by the invention. The material of the tape or web 38 serves as a vehicle for holding the meltable material and the heat conducting ingredient, if any, in a form such as the gaskets which can be readily handled. In an alternate method of practicing the invention, the meltable materials and the heat conductive materials that are added to it can be mixed with fibers after which the mixture is poured out or rolled into sheets or webs of a material which can be shaped into gaskets or into another preferred form. In another variation of the invention, it is possible to use tapes or sheets of synthetic, plastic material which is foraminated or otherwise made porous, and the openings in which are filled with wax and fatty materials that will melt at temperatures above room temperature but below the operating temperature limits of the electronic apparatus to be protected. For some applications, loosely woven fibrous materials such as inexpensive papers are preferred, and such a material is shown in cross-section in FIG. 14 where the numerals 86, 88 and 90 represent mono-filament fibers, some natural, like glass cellulose, and some synthetic such as plastic filaments. This preferred embodiment is composed mostly of glass filaments.

Disposed between those fibers are deposits, some in the form of globules between fibers and others as coatings over fibers, which are identified by reference numerals 90, 92 and 94. Some of those added materials include only wax, where others include wax and the heat conductive metallic oxides, and still others which include both wax and petroleum jelly.

Figure 14:
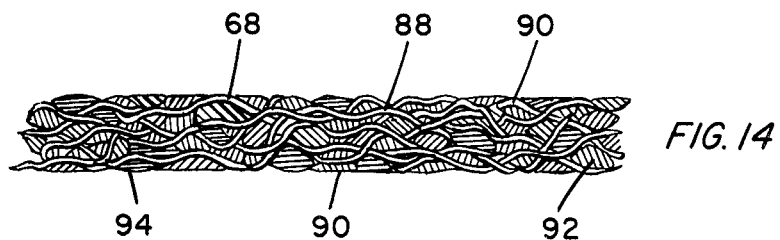
FIG. 14 is a diagram in cross-section form illustrating the internal arrangement of the ingredients in a preferred form of gasket product made according to the invention.

The fibers in FIG. 14 are mostly glass fibers. Glass is a poor conductor of electricity and a good conductor of heat. It is wetted readily by molten waxes and fats, and it is inexpensive. Glass fibers can be woven to form a resilient sheet. However, the inclusion of plastic filaments, and of cellulose treated to esentially mono-filament form, is helpful. The several filaments have different diameters and different degrees of curl and twist and wetting quality. In combination they permit more uniform impregnation by the heat conducting materials.

Figure 15:
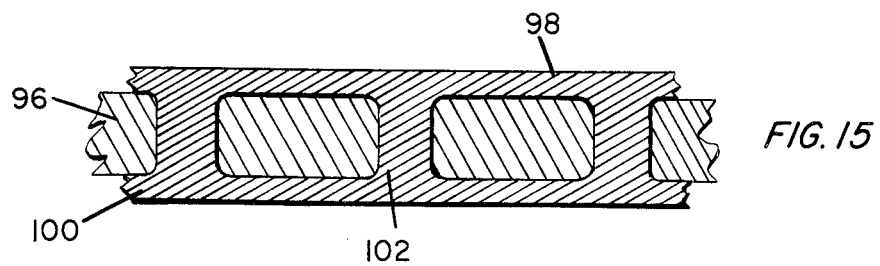
FIG. 15 is a cross-sectional view illustrating another preferred form of a gasket product according to the invention.

The embodiment of FIG. 15 recognizes that it is more important to eliminate air from the space between the heat sink and an electronic component than it is to provide a highly heat conductive flow path. Even a relatively poor heat conductor in solid or liquid form can serve effectively if the voids are filled so no air layer remains. Given a layer of a solid material, much improvement is obtained, even if only the surface of the sheet melts to fill voids and replace air. The gasket of FIG. 15 has a central layer 96 of plastic material both sides of which are coated or meltable mixture of wax, zinc oxide and a fire retardant. In this particular design, the plastic is foraminated. Several holes are visible in the fragment selected for illustration, and the meltable mixture extends entirely through the holes from upper layer 98 to lower layer 100. One of the holes has been numbered 102 for identification.

For the purpose of this application, the term "normal room temperature" means temperatures between 18° C. and 35° C., and the term "range above normal temperatures" means temperatures between 35° C. and 65° C.

Although we have shown and described certain specific embodiments of our invention, we are fully aware that many modifications thereof are possible. Our invention, therefore, is not to be restricted except insofar as is necessitated by the prior art.

We claim:

1. For application to the surfaces of electronic apparatus, a heat conducting an electrically nonconducting sheet of synthetic material having a coating of material on each side of the sheet which coating comprises a material which changes state from solid to liquid form in the temperature range above room temperatures and in the temperature range in which said electronic apparatus operates.

* * * * *